(12) United States Patent
Luster

(10) Patent No.: US 6,324,016 B1
(45) Date of Patent: Nov. 27, 2001

(54) TELECENTRIC LENS

(76) Inventor: Spencer D. Luster, 3207 Algonquin Pkwy, Toledo, OH (US) 43606

( * ) Notice: Subject to any disclaimer, the term of this patent is extended or adjusted under 35 U.S.C. 154(b) by 0 days.

(21) Appl. No.: 09/432,371

(22) Filed: Nov. 3, 1999

Related U.S. Application Data

(60) Provisional application No. 60/108,950, filed on Nov. 18, 1998.

(51) Int. Cl.$^7$ ............................ G02B 13/22; G02B 17/00
(52) U.S. Cl. ...................... 359/663; 359/364; 359/419; 359/431; 359/433; 359/631; 359/727; 359/740
(58) Field of Search ..................................... 359/364, 419, 359/431, 433, 726, 727, 744, 663, 737, 738–740, 631

(56) References Cited

U.S. PATENT DOCUMENTS

| | | | |
|---|---|---|---|
| 4,747,678 | * 5/1988 | Shafer et al. | 359/366 |
| 5,073,016 | * 12/1991 | Burke | 359/727 |
| 5,383,052 | * 1/1995 | Okazaki et al. | 359/364 |
| 5,663,833 | * 9/1997 | Nanba et al. | 359/631 |
| 5,742,436 | * 4/1998 | Furter | 359/727 |
| 5,825,553 | * 10/1998 | Chen | 359/643 |
| 5,999,311 | * 12/1999 | Nanba et al. | 359/365 |
| 5,999,333 | * 12/1999 | Takahashi | 359/726 |
| 6,008,948 | * 12/1999 | Togino | 359/637 |
| 6,021,004 | * 2/2000 | Sekita et al. | 359/676 |
| 6,128,144 | * 10/2000 | Togino | 359/728 |

* cited by examiner

Primary Examiner—Georgia Epps
Assistant Examiner—Evelyn A Lester
(74) Attorney, Agent, or Firm—Donald R. Fraser

(57) ABSTRACT

A reflective telecentric lens which uses an on-axis type concave mirror in a pseudo-off-axis manner to avoid blockage of a portion of the field of view. The concave mirror used in a pseudo-off-axis manner permits the telecentric stop, imaging lens, and film or an electronic detector to be moved outside of the field of view.

13 Claims, 3 Drawing Sheets

TELECENTRIC LENS

This is a continuation of provisional patent application Serial. No. 60/108,950, filed Nov. 18, 1998.

FIELD OF THE INVENTION

The present invention relates to a telecentric lens for use in viewing terrestrial objects, and more particularly to a reflective telecentric lens and an on-axis type concave mirror to avoid blockage of a portion of the field of view.

BACKGROUND OF THE INVENTION

A conventional lens is incapable of accurately portraying objects that are off axis to the lens or at different distances from the lens. These perspective distortions can create significant problems for optical systems such as, for example, interpretation of data by computer software. A telecentric lens, however, maintains a constant viewing angle at any point across the clear aperture of an associated objective lens. The telecentric lens can therefore be used to accurately portray objects that are slightly off axis or at different distances from the lens. The ability to accurately portray objects in the manner described makes the telecentric lens particularly suitable for use in measurement devices for manufacturing processes. By eliminating perspective distortion, the telecentric lens produces a dimensionally accurate image, which is simple for software to interpret.

In prior art telecentric lenses, the refractive elements are formed by materials such as glass or plastic for visible light; and other materials are employed for use in the infrared region of the electromagnetic spectrum. For any particular type of material used, however, the useable spectral range is greatly limited. Also, as is the case for all imaging devices, as the required size of the device is increased, the weight, complexity, and cost are increased in order to maintain reasonable performance. As the size of refractive imaging devices increase, the imaging devices become problematic more quickly than equivalent performance reflective devices, once a certain size threshold is reached. Such inherent problems are the reasons that larger optical telescopes are made from concave mirrors (reflector telescopes) as opposed to glass elements (refractor telescopes). Also, in general, reflective imaging devices require far fewer optical elements than refractive devices of the same general performance.

Telecentric lenses of the type used to form images of close terrestrial objects, especially at magnifications that are more useful for industrial imaging such as automated inspection or machine vision, have been limited to all-refractive designs. One of the reasons for this limitation is that imaging of near or terrestrial objects can suffer greatly from having a portion of the field of view blocked by a central transfer mirror or lens. The transfer mirror or lens is used with near impunity for astronomical telescopes used for viewing objects that are nearly infinitely far away and thus remain relatively unaffected by the central blocker. U.S. Pat. No. 4,798,450 to Suzuki discloses other multiple mirror designs that overcome the central blocker problem for terrestrial objects, and consist of special and expensive mirror forms such as off-axis parabolas, ellipsoids, or hyperboloids.

An object of the invention is to produce a reflective telecentric lens that may be constructed less expensively than equal performance all-refractive telecentric lenses.

Another object of the invention is to produce a reflective telecentric lens that may be constructed less expensively than multi-mirror reflective telecentric lens designs.

Another object of the invention is to produce a reflective telecentric lens having fewer components than equivalent performance devices of prior art.

Another object of the invention is to produce a reflective telecentric lens that may be easily re-configured to accommodate different magnifications.

Still another object of the invention is to produce a reflective telecentric lens that has improved optical performance.

SUMMARY OF THE INVENTION

The concept of using a concave mirror as part of an optical imaging device is known. Mirror based telescopes are also well known. However, telescopes are designed for viewing infinitely far astronomical objects and thus not subject to the same design limitations as optics designed for viewing close, terrestrial objects.

The present invention uses a simple concave mirror form as a primary collector mirror/lens along with a small aperture and a relatively simple secondary lens to create a telecentric lens system for viewing near or terrestrial objects at magnifications that are useful for industrial inspection or measurements, along with the arrangements that overcome the central blocker problem. These arrangements typically consist of a beamsplitter, a true off-axis concave mirror, or a tilted on-axis concave mirror in a pseudo-off-axis manner.

The design of a concave-mirror based telecentric lens allows for a larger useable clear aperture than is currently commercially available with all refractive optics designs. Additionally, the component cost of constructing such a telecentric lens is inherently less than for all-refractive designs of similar capability in terms of size as well as optical imaging performance. Finally, a mirror-based lens generally allows for a broader useable spectral range than all-refractive designs that will be more subject to image degradation due to chromatic aberration.

The above, as well as other objects of the invention, may be readily achieved by a telecentric lens comprising a concave mirror defining a primary collector lens for receiving light rays from a terrestrial object and for emitting the light, the collector lens having a first and a second optical axis defining a first and second optical path, the light emitted from the collector lens having a focal point along the second optical axis of the collector; an image lens disposed along the second optical axis of the collector lens in the second optical path; and a telecentric stop disposed at the focal point along the second optical axis of the collector lens between the collector lens and the image lens.

BRIEF DESCRIPTION OF THE DRAWINGS

The above, as well as other objects, features, and advantages of the present invention will be readily apparent to those skilled in the art from reading the detailed description of the preferred embodiments of the present invention when considered in light of the accompanying drawings, in which.

DETAILED DESCRIPTION OF THE PREFERRED EMBODIMENT

Figure 1:
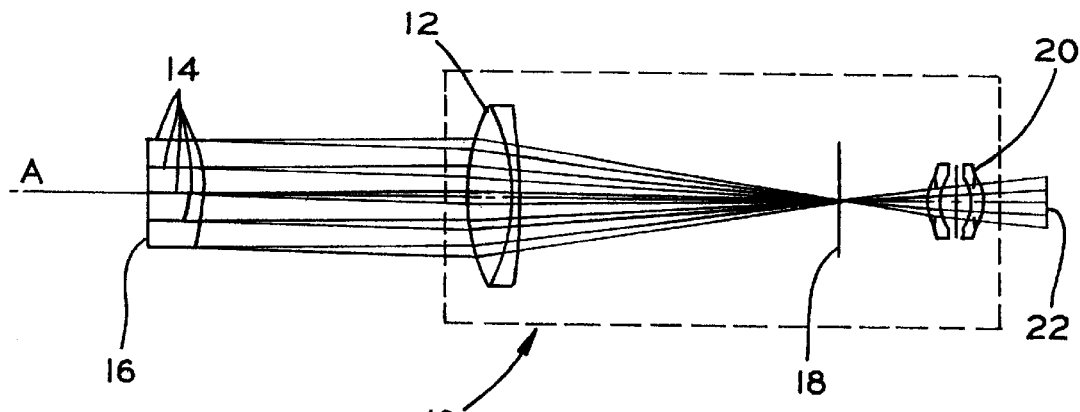
FIG. 1 is a schematic view of a typical purely refractive telecentric lens.

Referring to the drawings, FIG. 1 illustrates a purely refractive telecentric lens system generally indicated by reference numeral 10. The telecentric lens system 10 includes a collector lens 12 that collects incoming light rays 14 from a near object 16. A telecentric stop 18 having a small aperture is disposed at the focus of the collector lens 12. By virtue of being at the focus of the collector lens 12, the telecentric stop 18 allows only those light rays 14 travelling along an optical path that is substantially parallel to an optical axis A to enter the system. Beyond the telecentric stop 18 is the so-called base or an imaging lens 20. The imaging lens 20 may be reflective or refractive. The imaging lens 20 collects the light rays 14 that diverge from the telecentric stop 18 and re-images the collected light rays 14 at the image plane 22 where a film or an electronic detector (not shown) might be placed to detect the light rays 14.

The above arrangement provides many advantages over standard lenses. The advantages include constant perspective angle over the field of view, greater depth of field, more constant magnification, and a greatly improved ability to produce high contrast images of otherwise slight or subtle refractive anomalies in objects or material under examination.

Typically, for best optical performance, both the collector lens 12 and the imaging lens 20 for the above-described embodiment are of multi-element design. One consequence of such a lens system is that the cost and weight of a large collector for a large aperture telecentric lens system of this form can be very high. Also, the total length of the telecentric lens system can be large. Finally, for any size all refractive telecentric lens system, the collector elements must be of complex design in order to provide acceptable optical performance for many industrial inspection applications.

Figure 2:
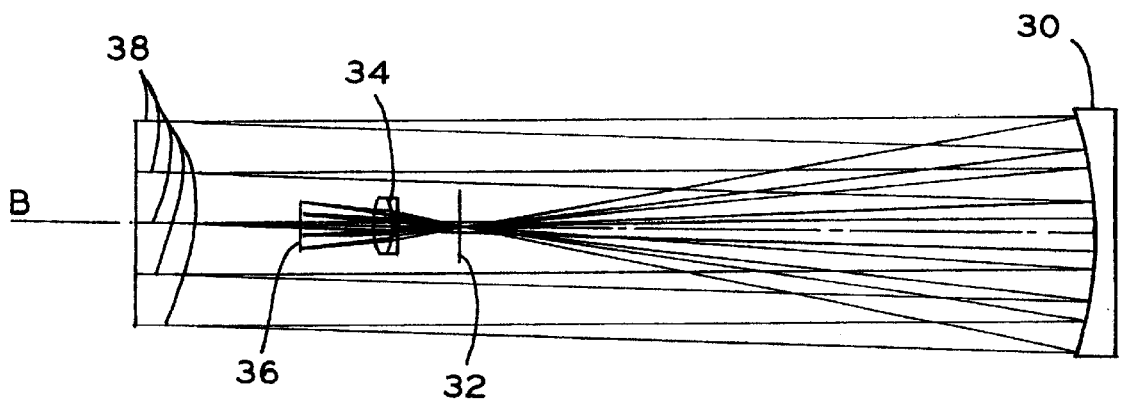
FIG. 2 is a schematic view of a typical reflective telecentric lens.

In FIG. 2, there is illustrated a reflective telecentric lens system including a concave mirror 30 as the primary light collector or attachment lens. The concave mirror 30 may take many forms, but particularly useful is the shape of a paraboloid. A spherical shape may produce almost as good optical performance as that of a paraboloid provided it is not operated at too small an f/number.

After the collector mirror 30, the remainder of the telecentric lens system is similar to that illustrated in FIG. 1. A small telecentric stop 32 is placed at the focus of the collector mirror 30 while an imaging lens 34 is placed somewhere beyond the telecentric stop 32 relative to the collector mirror 30.

One of the great drawbacks of the configuration illustrated in FIG. 2, however, is that the telecentric stop 32 and imaging lens 34, as well as any film or detector placed at the image plane 36, will block the incoming light rays 38 that would otherwise enter the system near the optical axis B. Such central ray blocking is not very significant for astronomical imaging using a telescope, but is critically important for terrestrial and industrial viewing and inspection. A major portion of the field of view will be blocked in the latter case.

The present invention offers three solutions to the problem. The first of the solutions, illustrated in FIG. 3, utilizes a lens system wherein a beamsplitter 40 is disposed in front of a collector mirror 42, thus folding the light rays 44 out of the input path thereby requiring relocation of the telecentric stop 46, imaging lens 48 and detector (not shown) out of the input path of the light rays 44. The configuration illustrated in FIG. 3 may be referred to as an on-axis, beamsplitter approach. Illustrated is a very thin pellicle type beamsplitter 40 that offers the smallest effect on image quality as compared to a thick plate-type or cube-type beamsplitter. A disadvantage that remains with any beamsplitter system is that some of the incoming light rays 44 are lost from the system.

Figure 4:
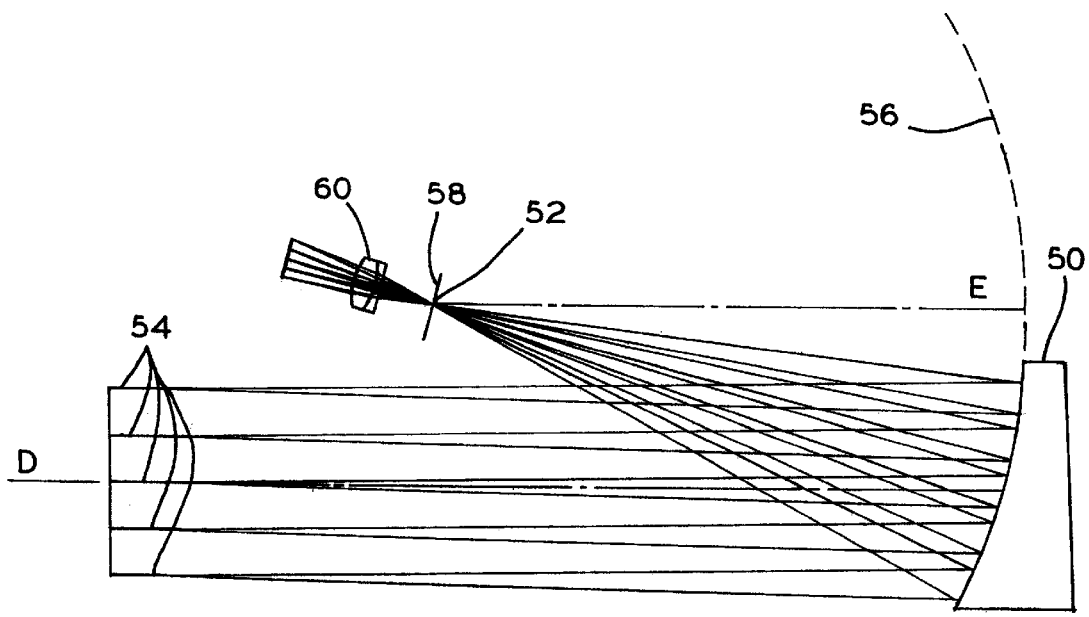
FIG. 4 is a schematic view of an off-axis type reflective telecentric lens incorporating the features of the present invention.

The second of the solutions to the ray blocking problem, illustrated in FIG. 4, is to use a concave collector mirror 50 that has been designed for off-axis operation. The collector mirror 50 is constructed so that the focus 52 does not lie along an optical axis D within the field of the incoming light rays 54, but along a second optical axis E where the light rays 54 are travelling along a second optical path. The resulting optical path requires locating a telecentric stop 58, an imaging lens 60 and a detector (not shown) out of the input path of the light rays 54.

The telecentric lens system illustrated in FIG. 4 is a true off-axis approach. Such off-axis mirrors 50 are common optical elements, though they are generally much more expensive than on-axis mirrors having the same aperture and focal length. The reason for the additional expense is that the off-axis component is generated as if it were cut from a much larger aperture form, in this case a larger diameter paraboloid 56 that otherwise has the same shape—that is, it is described by the same equation but with a larger extent.

Figure 3:
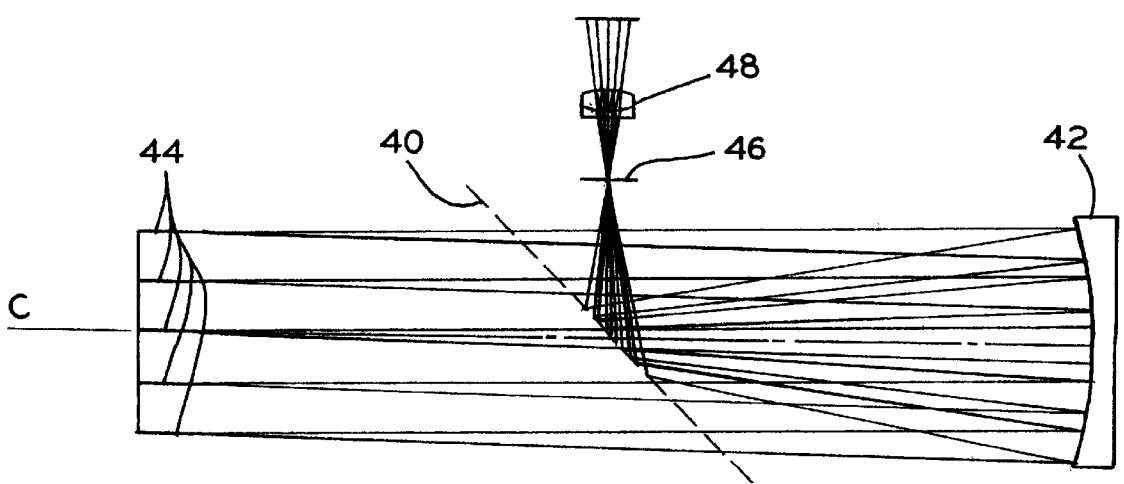
FIG. 3 is a schematic view of an on-axis, beamsplitter type reflective telecentric lens incorporating the features of the present invention.

A particular optical performance advantage of the methods illustrated in FIGS. 3 and 4 is the extremely low distortion aberration that results as compared to even very complex and expensive all refractive designs.

Figure 5:
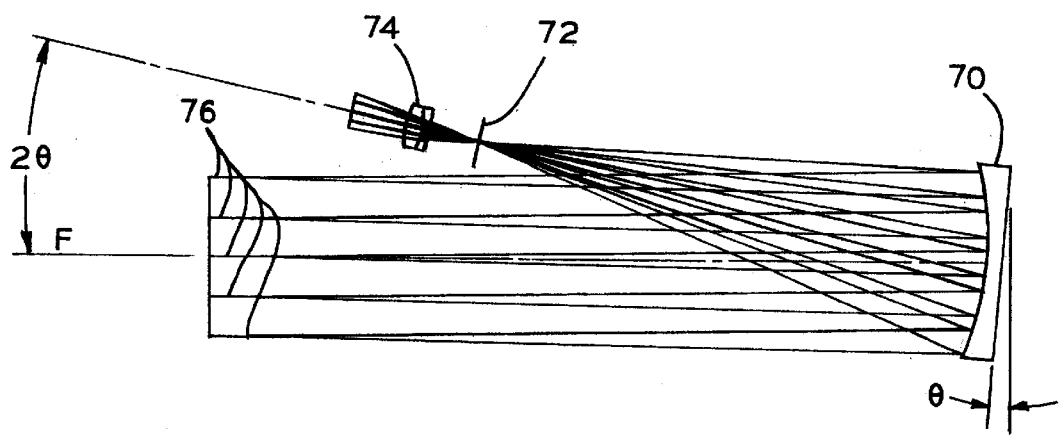
FIG. 5 is a schematic view of a pseudo-off-axis type reflective telecentric lens incorporating the features of the present invention.

The third of the solutions to the ray blocking problem, illustrated in FIG. 5, is to use an on-axis type collector mirror 70 in off-axis mode. The use of an on-axis type collector mirror 70 is achieved by tilting the collector mirror 70 by some angle θ, then placing a telecentric stop 72, an imaging lens 74, and a detector (not shown) of the telecentric lens system further off-axis at an angle of 2θ out of the input path of the light rays 76. Such a pseudo-off-axis approach maintains a lower cost for the collector mirror 70 while solving the central blocking problem. A disadvantage of this approach is that using a normal concave collector mirror 70 in an off-axis mode will typically produce greater optical aberrations than would otherwise be present. However, the optical performance can still be quite high, better in fact than current all refractive designs of telecentric lens systems of equal aperture and magnification when used with spectrally broad band illumination.

Figure 6:
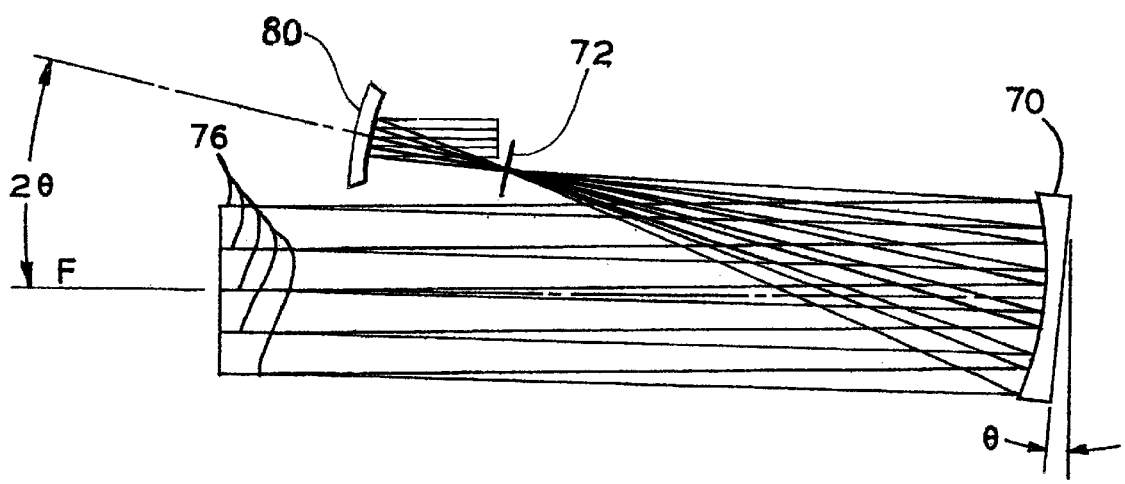
FIG. 6 is a schematic view of the telecentric lens of FIG. 5 including a reflective lens.

The third of the solutions to the ray blocking problem, illustrated in FIG. 5, is to use an on-axis type collector mirror 70 in off-axis mode. The use of an on-axis type collector mirror 70 is achieved by tilting the collector mirror 70 by some angle θ, then placing a telecentric stop 72, an imaging lens 74, and a detector (not shown) of the telecentric lens system further off-axis at an angle of 2θ out of the input path of the light rays 76. Such a pseudo-off-axis approach can be accomplished at a lower cost for the collector mirror 70 while solving the central blocking problem. A disadvantage of such an approach is that the use of a normal concave collector mirror 70 in an off-axis mode will typically produce greater optical aberrations than would otherwise be present. However, the optical performance can be quite better than current all refractive designs of telecentric lens systems of equal aperture and magnification when used with spectrally broad band illumination. In another embodiment of the third of the solutions, the imaging lens 74 illustrated as a refractive lens in FIG. 5, is replaced with a reflective lens 80, as illustrated in FIG. 6.

One practical consideration of this method is that the off-axis angle θ may be reduced when the telecentric lens system is designed with a rectangular or especially linear detector (such as a linear array camera). The reason for using the rectangular or especially linear detector is that instead of requiring that the off-axis angle θ be great enough to allow the telecentric stop 72, imaging lens 74, and detector (not shown) to be moved out of the circular, full clear optical path of the mirror collector 70, the off-axis angle θ need only be large enough to allow the combination to be moved out of the smaller rectangular or linear clear aperture path of the projection of the detector. The advantage of reducing the off-axis angle θ is that it decreases off-axis optical aberrations.

In all three cases, the imaging lens 48, 60, or 74 can be of a relatively simple form while still producing excellent optical performance for the whole system. The preferred embodiments shown here, for example, use a so-called achromatic doublet made of two glass types. It will be recognized by those skilled in the art that other imaging lens types and focal lengths may also be used including more complex glass lenses, the newer hybrid refractive/diffractive lenses, gradient index lenses (lenses that achieve some or all of their optical power by virtue of the fact that the refractive index of their material varies as a function of position within the lens), and mirrors. It will be further recognized by those skilled in the art that plane mirrors may be added to fold the optical path and reduce the overall size of the telecentric lens system without affecting the system performance.

Another feature common to all three designs is that even with constant focal length elements (collector mirror and imaging lens), the telecentric lens system magnification may be adjusted by changing the aperture-to-imaging lens distance along with the imaging lens-to-image plane distance.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A telecentric lens comprising:
    a first lens for receiving light rays from an object and for emitting the light rays, said first lens having a reflective surface, a first and a second optical axis, and a focal point disposed along the second optical axis of said first lens;
    a refractive lens for receiving the light rays emitted by said first lens and for emitting the light rays, said refractive lens disposed along the second optical axis of said first lens; and
    a telecentric stop for permitting only the light rays emitted from said first lens to pass to said refractive lens, said telecentric stop disposed at the focal point of said first lens along the second optical axis of said first lens between said first lens and said refractive lens.

2. The telecentric lens described in claim 1 wherein the first optical axis defines a first optical path.

3. The telecentric lens described in claim 2 wherein said first lens is disposed at an angle whereby the focal point along the second optical axis of said first lens, said refractive lens, and said telecentric stop are disposed outside of the first optical path.

4. The telecentric lens described in claim 1 wherein said first lens is an off-axis lens.

5. The telecentric lens described in claim 1 wherein said first lens is an on-axis lens used in an off-axis manner.

6. The telecentric lens described in claim 2 wherein the focal point along the second optical axis of said first lens, said refractive lens, and said telecentric stop are disposed outside of the first optical path.

7. A telecentric lens comprising:
    a first lens for receiving light rays from an object and for emitting the light rays, said first lens having a reflective surface and a first and a second optical axis defining a first and a second optical path;
    a beamsplitter for deflecting the light rays emitted by said first lens to define a third optical axis with a focal point and a third optical path, whereby the focal point along the third optical axis is disposed outside of the first optical path;
    a second lens for receiving the light rays deflected by said beamsplitter and for emitting the light rays, said second lens disposed along the third optical axis in the third optical path; and
    a telecentric stop for permitting only the light rays emitted by said first lens and deflected by said beamsplitter to pass to said second lens, said telecentric stop disposed at the focal point along the third optical axis between said beamsplitter and said second lens.

8. The telecentric lens described in claim 7 wherein said second lens is a refractive lens.

9. The telecentric lens described in claim 7 wherein said second lens is a reflective lens.

10. A telecentric lens comprising:
    a first lens for receiving light rays from an object and for emitting the light rays, said first lens having a reflective surface, a first and a second optical axis, and a focal point disposed along the second optical axis of said first lens, wherein said first lens is an on-axis lens used in an off-axis manner;
    a second lens for receiving the light rays emitted by said first lens and for emitting the light rays, said second lens disposed along the second optical axis of said first lens; and
    a telecentric stop for permitting only the light rays emitted from said first lens to pass to said second lens, said telecentric stop disposed at the focal point of said first lens along the second optical axis of said first lens between said first lens and said second lens.

11. The telecentric lens described in claim 10 wherein said second lens is a refractive lens.

12. The telecentric lens described in claim 10 wherein said second lens is a reflective lens.

13. A telecentric lens comprising:
    a first lens for receiving light rays from an object and for emitting the light rays, said first lens having a reflective surface and a first and a second optical axis defining a first and a second optical path;
    a beamsplitter for deflecting the light rays emitted by said first lens to define a third optical axis with a focal point and a third optical path, whereby the focal point along the third optical axis is disposed outside of the first optical path;

a reflective lens for receiving the light rays deflected by said beamsplitter and for emitting the light rays, said reflective lens disposed along the third optical axis in the third optical path; and a telecentric stop for permitting only the light rays emitted by said first lens and deflected by said beamsplitter to pass to said reflective lens, said telecentric stop disposed at the focal point along the third optical axis between said beamsplitter and said reflective lens.

* * * * *